United States Patent [19]

Case, Jr. et al.

[11] Patent Number: 4,664,587
[45] Date of Patent: May 12, 1987

[54] ROBOTICS TOOL CARRIER ASSEMBLY

[75] Inventors: Allen W. Case, Jr., Amsterdam; Richard M. Lund; Stuart G. Miller, both of Scotia; Donald C. Peroutky, Schenectady, all of N.Y.

[73] Assignee: General Electric Company, Schenectady, N.Y.

[21] Appl. No.: 631,266

[22] Filed: Jul. 16, 1984

[51] Int. Cl.[4] .............................................. B66F 11/00
[52] U.S. Cl. ................................. 414/680; 219/124.1; 219/124.33; 219/123.1; 228/45; 414/917; 901/42
[58] Field of Search ..................... 414/680, 749, 917; 901/42; 219/124.33, 124.1, 125.1, 136; 228/45

[56] References Cited

U.S. PATENT DOCUMENTS

| | | | |
|---|---|---|---|
| 3,133,186 | 5/1964 | Greene et al. | 219/125 |
| 3,443,732 | 5/1969 | Wall, Jr. et al. | 228/7 |
| 3,452,180 | 6/1969 | Bollinger et al. | 219/125 |
| 3,511,966 | 5/1970 | Bone | 219/131 |
| 3,845,271 | 10/1974 | Hirano et al. | 219/124 |
| 3,918,622 | 11/1975 | Larsen | 228/8 |
| 4,021,840 | 5/1977 | Ellsworth et al. | 358/101 |
| 4,112,289 | 9/1978 | Mead et al. | 219/124.33 |
| 4,118,620 | 10/1978 | Wall, Jr. et al. | 219/124.32 |
| 4,188,525 | 2/1980 | Merrick et al. | 219/125.12 |
| 4,219,723 | 8/1980 | Maezawa et al. | 219/125.1 |
| 4,242,620 | 12/1980 | Fujiwara et al. | 318/576 |
| 4,292,495 | 9/1981 | Saito et al. | 219/125.12 |
| 4,302,655 | 11/1981 | Edling | 219/130.32 |
| 4,302,656 | 11/1981 | Poth et al. | 219/137 PS |
| 4,328,416 | 5/1982 | Dudley et al. | 250/202 |
| 4,367,532 | 1/1983 | Crum et al. | 901/4 X |
| 4,507,044 | 3/1985 | Hutchins et al. | 901/21 X |

FOREIGN PATENT DOCUMENTS

| | | | |
|---|---|---|---|
| 2920767 | 11/1979 | Fed. Rep. of Germany | 219/125.1 |
| 5233585 | 6/1972 | Japan . | |
| 598751 | 3/1978 | U.S.S.R. | 901/42 |

Primary Examiner—Robert J. Spar
Assistant Examiner—Donald W. Underwood
Attorney, Agent, or Firm—Paul R. Webb, II; James C. Davis, Jr.

[57] ABSTRACT

A high response servodriven robotics tool carrier assembly is especially well adapted for carrying a tool, such as an arc welding torch. The robotics tool carrier assembly mounts the torch such that its tip is on the center line of the arm rotation axis of a robot welding machine. The robotics tool carrier assembly modulates the coarse robot movements which are programmed into the robot arm. A tilt linkage is used to tilt the torch about its tip so as to avoid obstructions. The tilt linkage is mounted upon a Z slide which adjusts the distance between the tip of the torch and a work surface. The Z slide is in turn mounted upon an X member movably mounted to an arm support so as to modulate the torch in a cross seam direction. The robotics tool carrier assembly mounts upon a robotics arm.

5 Claims, 5 Drawing Figures

ROBOTICS TOOL CARRIER ASSEMBLY

BACKGROUND OF THE INVENTION

This invention relates to robotics tool carrier assemblies and more particularly to robotics tool carrier assemblies for tools such as electric arc welding torches.

The use of robotics for moving a tool along a work surface is well known. Specifically, a robotics arm is programmed to move a tool such as an electric arc welding torch, laser, adhesive gun, or gasket gun along a preprogrammed path of a work surface which may include separate surfaces of two adjacent pieces.

A common problem in using robotics to control tools is that the typical robotics arm simply repeats its preprogrammed path in space while the needs of the application customarily dictate small variations in path, such as in precision electric arc welding. Precision welding requires sophisticated arc starting while maintaining torch electrode gap to workpiece spacing via arc voltage control and accurate positioning of the weld puddle over the weld joint by arc welding torch motion control. In addition, the typical welding robot has limited capability to weld complicated structures and avoid obstructions while maintaining geometric orientation integrity of filler wire to weld seam when used with the cold/hot wire gas tungsten arc welding (GTAW) process.

Although the prior art includes numerous robotic tool carrier structures, they have been subject to a number of limitations including low speed of response and position repeatability, and limited obstruction avoidance capability. For example, modulation of a robotics tool carrier in one direction may cause a change in another aspect of the tool's orientation. This cross-coupling requires a sophisticated computer program operating the robotics arm and robotics tool carrier such that other compensating adjustments are made. Prior art designs generally lack the ability to isolate or minimize cross-coupling from adjustments in one axis to another axis except for coarse movements or adjustments.

OBJECTS OF THE INVENTION

Accordingly, it is a primary object of the present invention to provide a new and improved robotics tool carrier assembly.

A more specific object of the present invention is to provide a robotics tool carrier assembly with an obstruction avoidance ability.

Another object of the present invention is to provide a tool carrier assembly which has a high speed of response for modulating nominal robot movements.

A further object of the present invention is to provide a tool carrier assembly which is adapted to mount upon a robotics arm or other manipulative device in order to supplement the coarse programmed motion of the robotics arm or device with precise vernier adjustments.

A further object of the present invention is to provide a robotics tool carrier assembly which provides for precision operations, such as precise arc welding.

Yet another object of the present invention is to provide a robotics tool carrier assembly in which cross-axis coupling adjustments may be measured.

SUMMARY OF THE INVENTION

The robotics tool carrier assembly mounts on a robotics arm and includes a highly advantageous tilt structure which allows a tool to avoid obstructions. The tilt structure, which is a tilt linkage arrangement, tilts a tool which is mounted thereon without changing the part of a work surface on which the tool is directed. The tilt structure is mounted to a Z slide which allows up and down adjustment of the tool. The Z slide in turn is mounted to an X carriage which pivots to adjust the tool in an X direction. Servomotors and angular position sensors are used for setting and measuring tilt, Z, and X positions.

The above and other objects of the present invention which will become apparent as the description proceeds are specifically realized by a robotics tool carrier assembly comprising: an arm mount adapted to mount the robotics tool carrier assembly on a robotics arm; a tilt linkage supported by the arm mount, said tilt linkage adapted to support a tool for movement normal to a work surface; and a tilt motor operable to tilt the tilt linkage relative to the arm support such that the tool is pivoted about a Y1 axis perpendicular to a Z axis extending between the tool and the work surface, the Y1 axis being no closer to the arm support than a tip of the tool, and the tilt motor and the tilt linkage together allowing change in the angle of the tool relative to the work surface without changing the part of the work surface on which the tool is directed. The robotics tool carrier assembly further comprises: a tool mounted on the tilt linkage and having a tip for movement normal to a work surface while the tool is directed upon the work surface. The tool, which is shown, is an electric arc welding torch. The robotics tool carrier assembly further comprises: an intermediate member supported by the arm mount, the tilt linkage being supported by the arm mount by way of the intermediate member; and an intermediate motor operable to move the intermediate member relative to the arm mount such that position of the tool tip may be changed. The robotics tool carrier assembly further comprises a tilt angular position sensor for sensing the position of the tilt linkage, and an intermediate angular position sensor for sensing the position of the intermediate member relative to the arm mount. The intermediate member is a Z slide operable to move the tool along the Z axis, and the intermediate motor is a Z motor operable to slide the Z slide. The robotics tool carrier assembly further comprises: an X member mounted to the arm support, the Z slide being mounted to the X member; and an X motor operable to move the X member relative to the arm support such that the position of the tool is adjusted in an X axis perpendicular to the Y1 axis and the Z axis. The X member is pivotably mounted to the arm mount to pivot about a Y2 axis parallel to the Y1 axis. The robotics tool carrier assembly further comprises a Z position sensor for sensing the position of the Z slide relative to the X member, and an X position sensor for sensing the position of the X member relative to the arm mount. The tilt position sensor is driven by the tilt motor, the Z position sensor is a Z angular position sensor driven by the Z motor, and the X position sensor is an X angular position sensor driven by the X motor. The tool shown is an electric arc welding torch.

The present invention may alternately be described as a robotics tool carrier assembly comprising: an arm mount adapted to mount the assembly on a robotics arm; an X member supported by the arm mount; a Z member supported by the arm mount; a tilt structure supported by the arm mount by way of the X member and the Z member, the tilt structure adapted to support a tool for movement normal to a work surface while the tool is directed upon the work surface; a tilt motor operable to tilt the tilt structure relative to the arm mount such that the tool may be pivoted about a Y1 axis perpendicular to a Z axis extending between the tool and the work surface, the tilt motor and the tilt structure together allowing change in the angle of the tool relative to the work surface without changing the part of the work surface on which the tool is directed; an X motor operable to move the X member relative to the arm mount such that the position of the tool is adjusted in an X axis perpendicular to the Y1 axis and the Z axis; and a Z motor operable to move the Z member relative to the arm mount such that the tool position is adjusted in the Z axis. The robotics tool carrier assembly further comprises a tool mounted on the tilt structure. The tool, which is shown, is an electric arc welding torch. The Z member is a Z slide and the Z motor drives the Z slide by a drive pulley. The assembly further comprises a Z position sensor for sensing the position of the Z slide relative to the X member, the Z position sensor being driven by the drive pulley. The tilt structure is a tilt linkage including two primary links pivotably attached to the Z member and two secondary links for pivotal attachment to a tool and at least one of the secondary links is pivotably attached to both of the primary links.

The present invention may alternately be described as a robotics tool carrier assembly comprising: a mount; an X member pivotably supported by the mount; a tilt structure supported by the mount by way of the X member; the tilt structure adapted to support a tool for movement normal to a work surface while the tool is directed upon the work surface; a tilt motor operable to tilt the tilt structure relative to the mount such that the tool may be pivoted in a Y1 axis perpendicular to a Z axis extending between the tool and the work surface, the Y1 axis being no closer to the mount than a working tip of the tool, the tilt motor and the tilt structure together allowing change in the angle of the tool relative to the work surface without changing the part of the work surface on which the tool is directed; and an X motor operable to pivot the X member about a Y2 axis relative to the mount such that the tool position is adjusted in an X axis perpendicular to the Y1 axis, the Y2 axis being parallel to the Y1 axis. The robotics tool carrier assembly further comprises a tool mounted in the tilt structure. The tool, which is shown, is an electric arc welding torch. The tilt structure is a tilt linkage including two primary links driven from the tilt motor and two secondary links adapted to pivotably mount a tool, the secondary links each pivotably mounted to at least one of the primary links. The assembly further comprises a Z slide slidably mounted to the X member and a Z motor operable to slide the Z slide relative to the mount such that the tool position is adjusted in the Z axis. The primary links are pivotably attached to the Z slide.

BRIEF DESCRIPTION OF THE DRAWINGS

The above and other features of the present invention will be more readily understood when the following detailed description is considered in conjunction with the accompanying drawings wherein like characters represent like parts throughout the several views and in which.

DETAILED DESCRIPTION OF THE DRAWINGS

Figure 1:
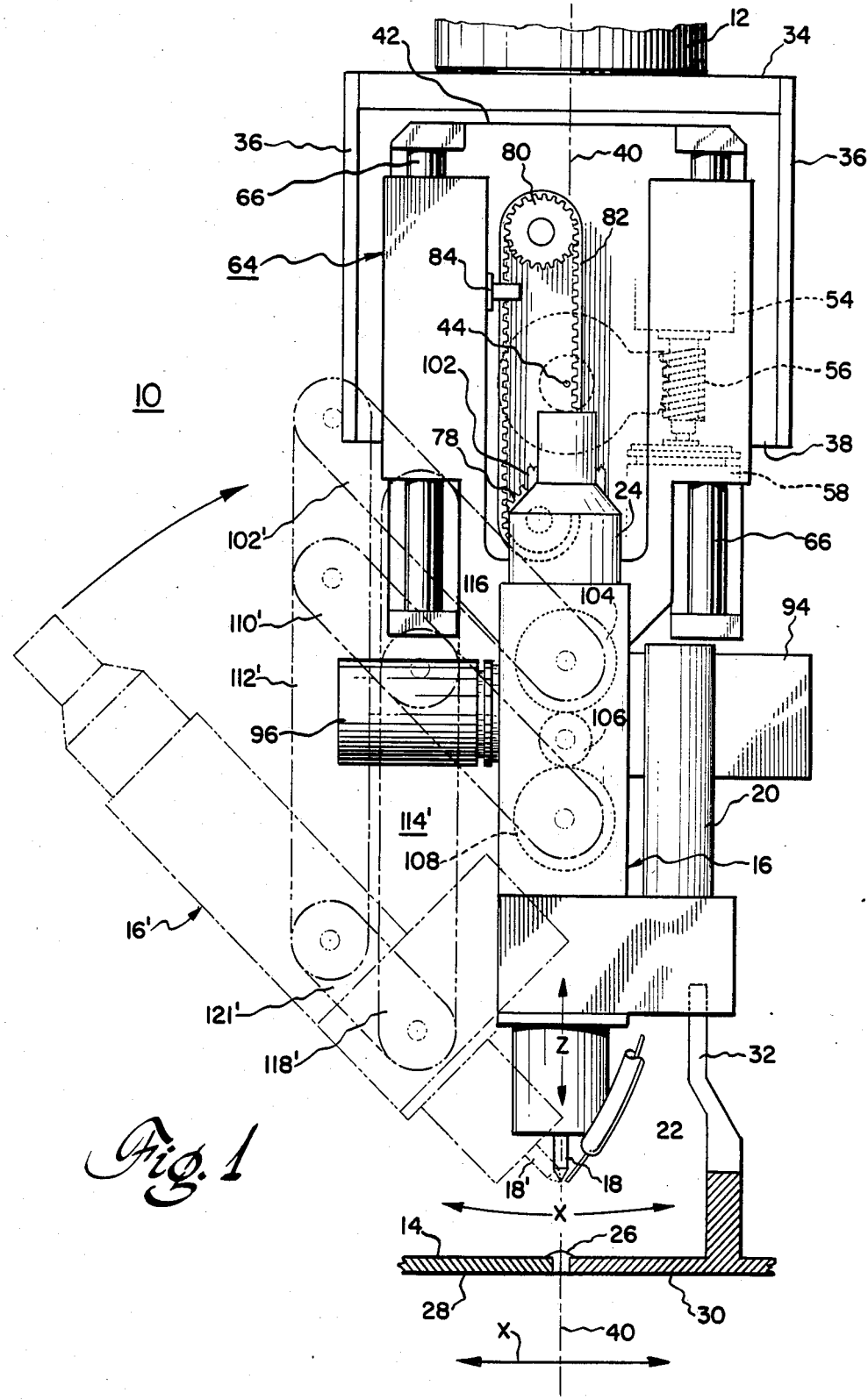
FIG. 1 shows a simplified front view of a robotics tool carrier assembly and tool according to the present invention with a tilt linkage having an alternate position shown in phantom line.
Figure 2:
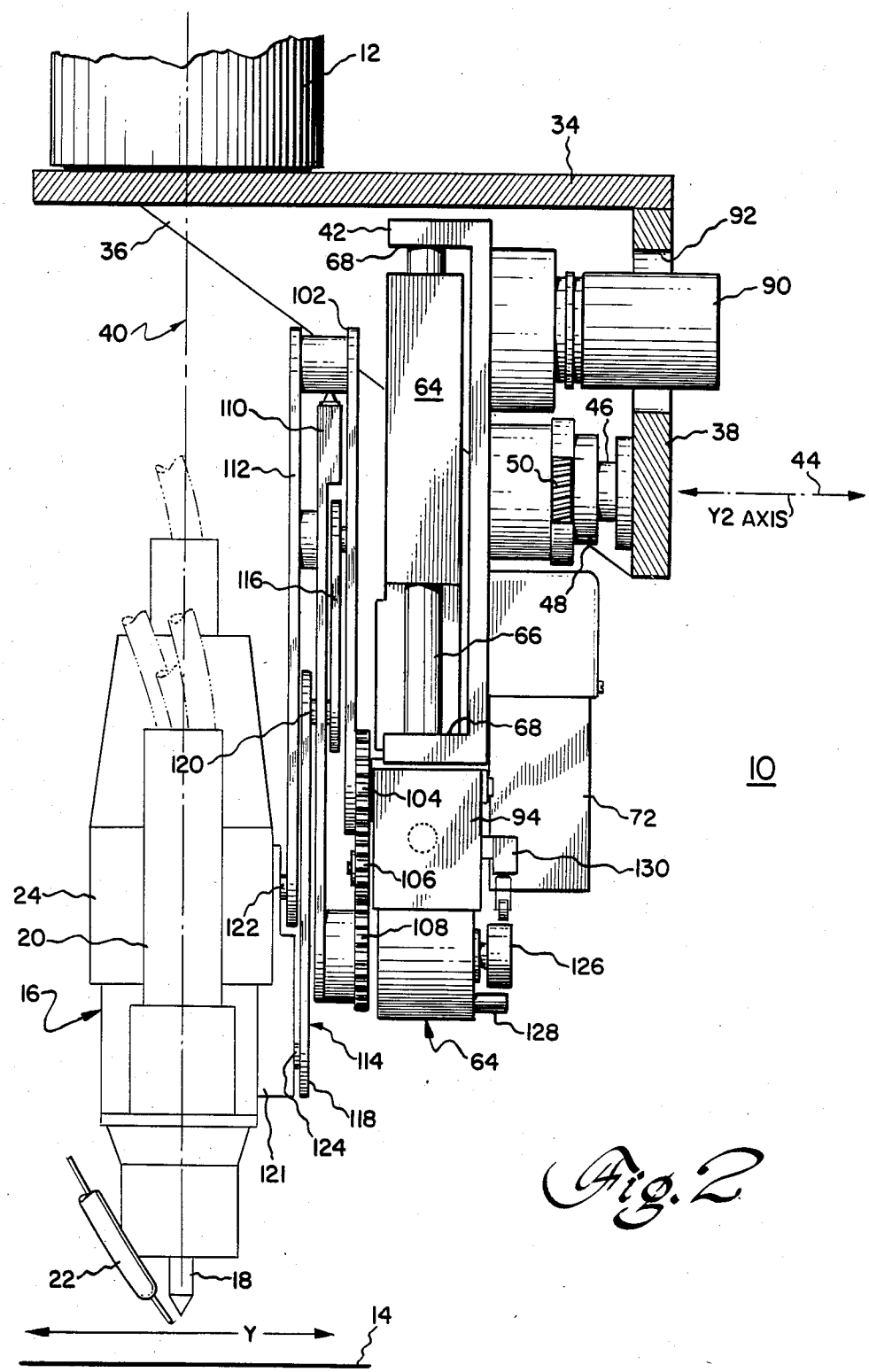
FIG. 2 shows a side of the robotics tool carrier assembly and tool of FIG. 1 with some parts in cross section.
Figure 3:
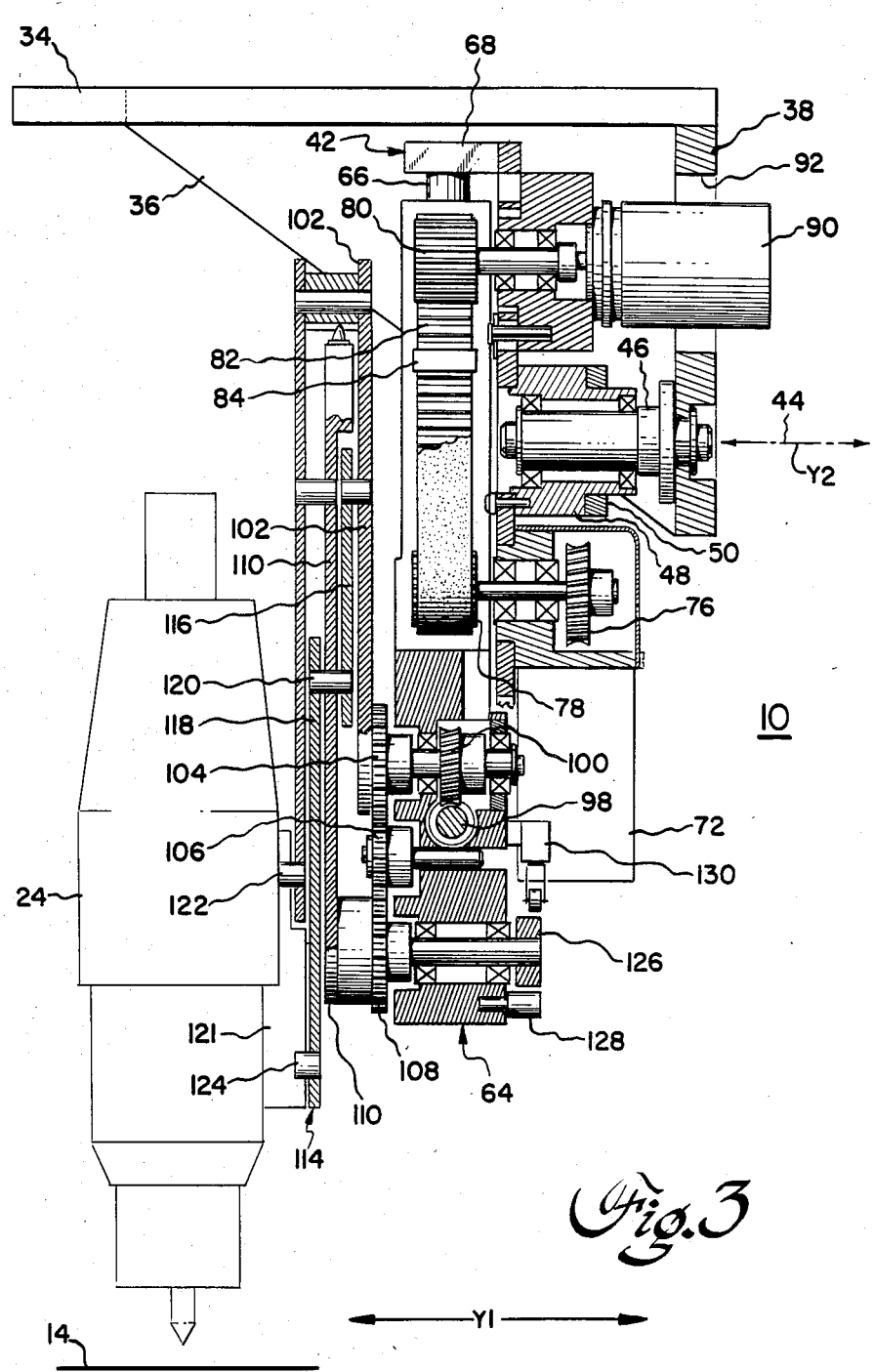
FIG. 3 shows a cross section side view of the robotics tool carrier assembly and tool of FIG. 1.

Turning now to FIGS. 1, 2, and 3, the robotics tool carrier assembly 10 of the present invention will be discussed in detail. FIG. 1 shows a simplified front view of the robotics tool carrier assembly 10 attached to a robotics arm 12 and above a working surface 14. FIG. 2 shows a simplified side view of the torch carrier assembly 10, robotics arm 12, and working surface 14 with one part of the carrier assembly 10 shown in cross section for ease of illustration. FIG. 3 shows a side view of the carrier assembly 10 with additional parts shown in cross section.

In FIGS. 1 and 2, a tool 16 such as an electric arc welding torch with an electrode 18 is disposed above the working surface 14 by the carrier assembly 10. Tool 16 is shown in an alternate position as 16' in phantom line in FIG. 1. The tool of FIG. 3 is a slightly different shape or configuration of an electric arc welding torch than the torch 16 of FIGS. 1 and 2. Torch 16 includes a tube 20 for supplying water, gas, and electric power to the GTAW torch 16. A wire feed 22 (FIGS. 1 and 2 only) may be mounted on arm 12 to feed wire to electrode 18. A housing 24 may include an internal lens system and a fiber optics cable extending from housing 24 such that an external T.V. camera may monitor the progress of electrode 18 relative to a seam at a weld puddle 26 in FIG. 1 disposed between work pieces 28 and 30. As shown, the work piece 30 might include a vertically extending portion 32.

The carrier assembly 10 includes an arm mount top plate 34, arm mount side plates 36 and arm mount back plate 38 all of which are fixed together. In FIGS. 1 and 2 the top plate 34 is shown fixed to a robotics arm 12 such that the center line of robot rotation 40 is in line with the electrode tip 18 for reasons which will be discussed in detail below.

The details of the tool 16 and the robotics system attached to robotics arm 12 need not be discussed in detail because the present robotics tool carrier assembly 10 may be used with any of numerous tools such as a torch and any of numerous robotics systems having a robotics arm such as arm 12. Generally, however, the robotics arm 12 is adapted to move along a Y direction (FIG. 2) such that the tip 18 may follow a seam between two work pieces such as 28 and 30 (FIG. 1). The robotics arm 12 additionally is operable to rotate about center line 40 to maintain proper tool orientation and may move in the X direction (FIG. 1) for cross-seam adjustments or welding seams extending in the X direction.

Figure 5:
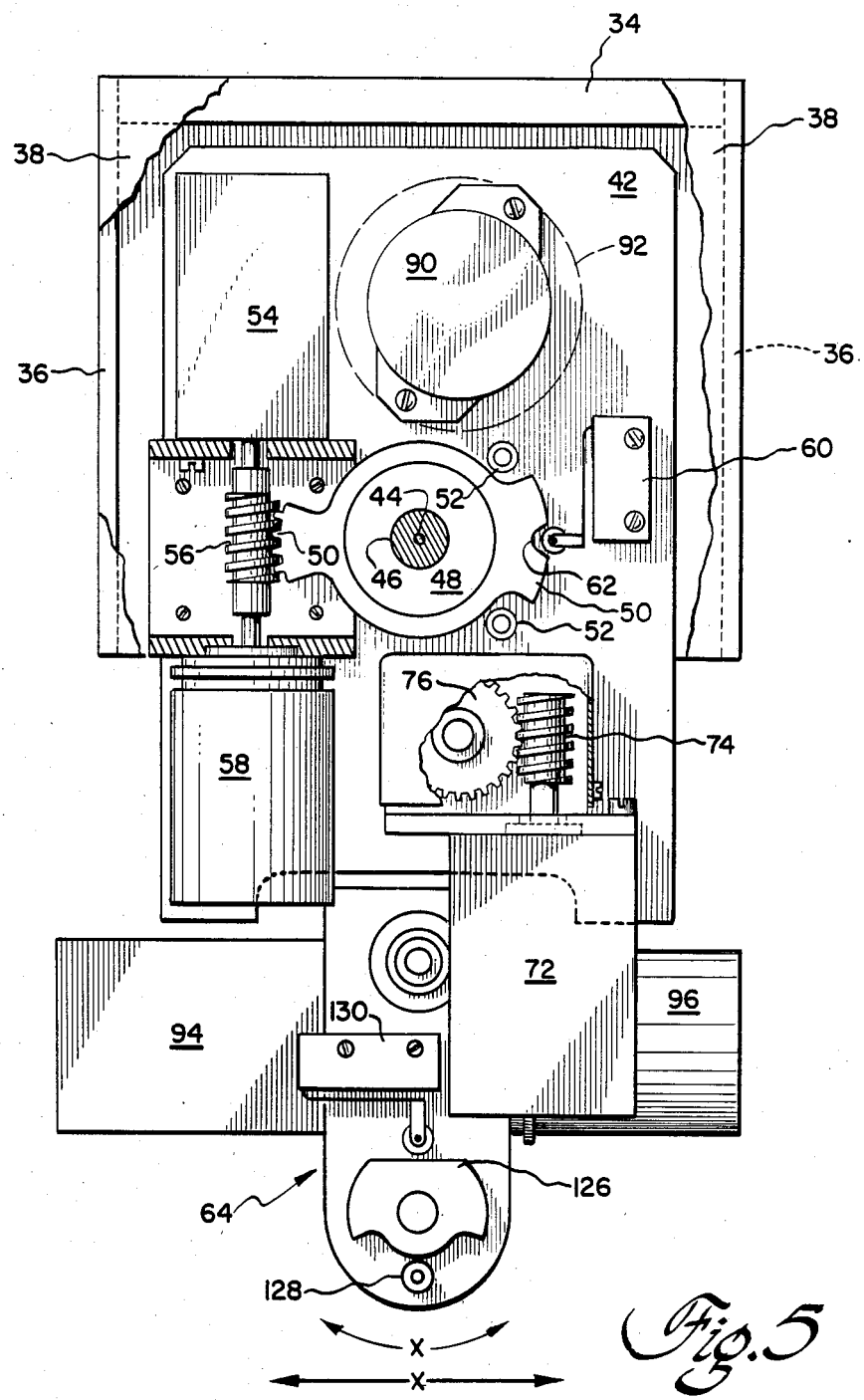
FIG. 5 shows a back view of the robotics tool carrier of FIG. 1 with some parts removed for clarity sake.

As it is best shown in FIGS. 2 and 3, an X member or carriage 42 is pivotably mounted to the back plate 38 to rotate about an axis 44. More specifically, the X member 42 is rotatable upon a shaft 46 secured to the arm mount back plate 38. Referring now also to FIG. 5, which shows a back view of the X member 42 with most of back plate 38 broken away for clarity, the shaft 46 is within a drive sleeve 48 fixed to the X member 42 and having a partial worm wheel 50 fixed thereto. The wheel movement is mechanically limited by X mechanical limits 52.

An X motor 54 is mounted on the arm mount back plate 38 and drives a worm 56. In addition to driving the worm wheel 50, the worm 56 drives an X resolver or angular position sensor 58 secured to the arm mount back plate 38. A limit switch 60 is fixed to X member 42 and limits movement of the worm wheel 50 such that the cam operated switch 60 is within cam notch 62.

Figure 4:
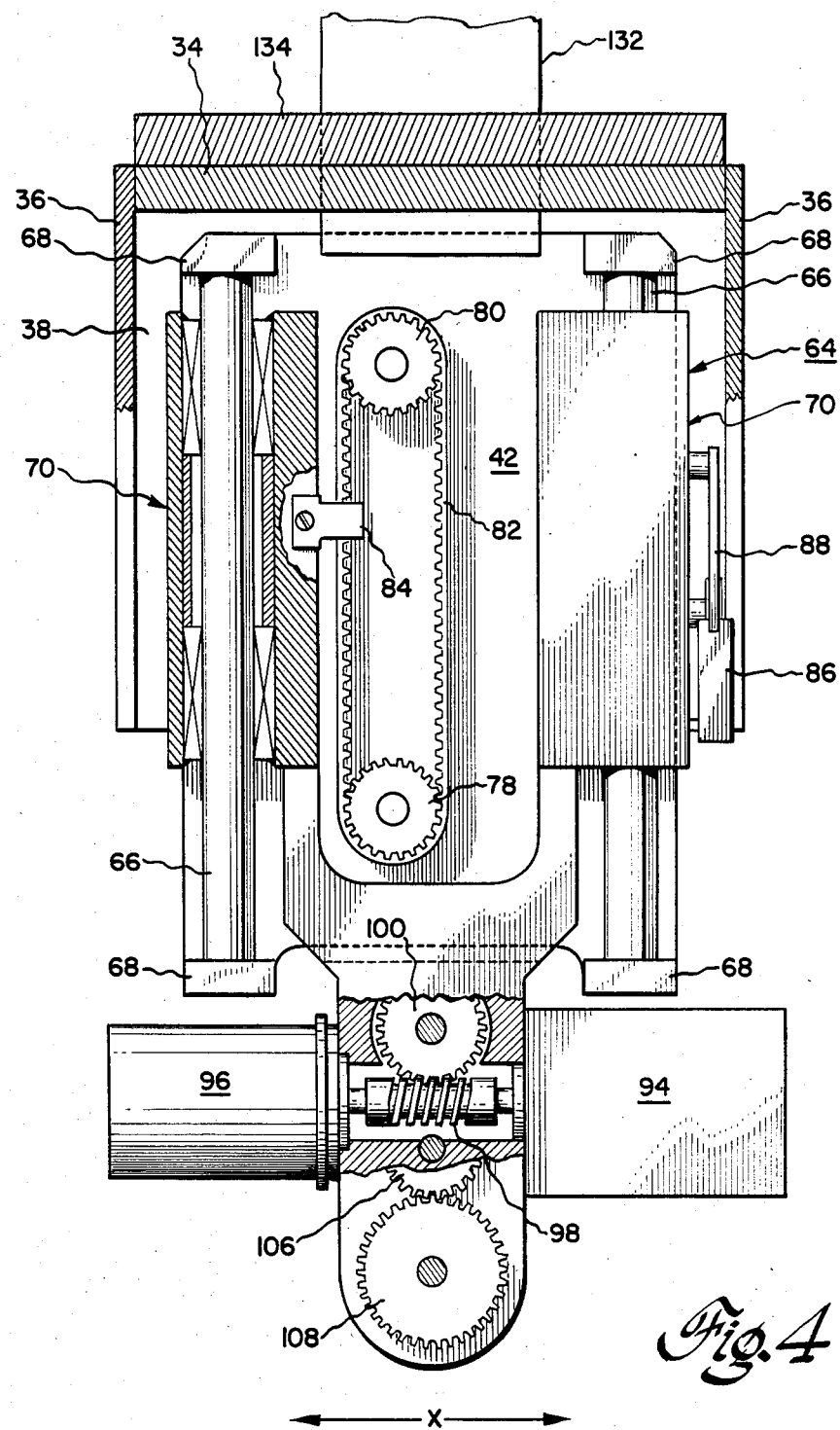
FIG. 4 shows a front view of parts of the robotics tool carrier assembly of FIG. 1.

Considering also FIG. 4 now, the mounting of a Z slide 64 upon the X member or carriage 42 will be discussed in detail. FIG. 4 shows a front view of the carrier assembly 10 of the present invention with the torch 16 and an associated linkage (discussed below) removed for simplicity. As shown, the Z slide 64 is adapted to slide upon two vertical extending bars 66 fixed to the upper and lower flanges 68 of the X member 42. As best shown by the left side of FIG. 4, the Z slide 64 includes right and left cylindrical portions or mounting tubes 70, each having channels (shown only for left side of FIG. 4 with partial break-away of the mounting cylindrical portion 70) to allow the Z slide to slide up and down between the pairs of upper and lower flanges 68 which serve as mechanical stops.

The drive system for the Z slide 64 comprises a Z motor 72 (best shown in FIGS. 2 and 5) which is fixed to the X carriage 42 and drives a Z worm 74 (FIG. 5). This Z worm 74 powers a Z worm wheel 76 (see especially FIG. 3) which in turn drives a pulley 78 connected to pulley 80 by a drive belt 82 (FIG. 1). A dog 84 (FIG. 4) fixes one of the mounting tubes or cylindrical portions 70 to the drive belt 82 such that rotation of the pulleys 78 and 80 will move the Z slide 64 up and down along the slide bars 66. A Z limit switch 86 (FIG. 4) is activated by cam 88 which is mounted on right mounting tube 70. The cam surface of cam 88 (not shown in detail) is shaped to actuate switch 86 to limit travel of Z slide 64.

A Z resolver or vertical position sensor 90 is driven by the upper pulley 80 as best shown in FIG. 3. Because the Z resolver 90 is driven by the Z motor 72 by way of the pulleys 78 and 80 and drive belt 82, it is important to prevent slippage of the drive belt 82 relative to the pulleys 78 and 80. Such slippage, which would adversely affect the accuracy of the Z resolver 90, is avoided by use of teeth (not shown) on the pulleys 78 and 80 and mating depressions (not shown) in the drive belt 82 to provide a positive grip between the drive belt 82 and the pulleys 78 and 80. Such positive grip drive belts and pulleys are standard components. As best shown in FIG. 3, the Z resolver 90 is disposed within a hole 92 within the back plate 38. The hole 92 is shaped such that the Z resolver 90 may move with rotation of the X carriage 42 without hitting the back plate 38.

As shown in FIG. 4, the Z slide 64 has a tilt motor 94 and a tilt resolver 96 connected to the tilt motor 94 by a tilt worm gear 98. The tilt worm gear 98 drives a tilt worm wheel 100 which in turn drives a primary link 102 (see especially FIGS. 2 and 3). The primary link 102 is mounted upon a gear 104 which mates with a spur gear 106 and in turn drives another gear 108 on which another primary link 110 is mounted.

The connections to the primary links 102 and 110 will be most easily understood from considering FIGS. 1 and 2. In particular, the primary link 102 is shown broken away in its neutral or zero degree position behind the housing 24, but is shown in phantom line as 102' in a tilted position in FIG. 1. Additionally, parallel and associated primary link 110 is shown in phantom line as 110' in FIG. 1 as are two secondary links 112 and 114 which are shown in phantom lines as 112' and 114' in FIG. 1. In the neutral or zero degree position, all of the links would be vertical and behind housing 24 in FIG. 1.

As shown in FIG. 1 in phantom line, the two parallel links 102 and 110 are each pivotably attached to both of the secondary links 112 and 114. As best shown in FIG. 2, the secondary link 114 may comprise an upper member 116 and a lower member 118 which are fixed to be in line by a common pivot 120. The links 112 and 114 are respectively pivotably connected to the torch mounting link 121 by pivot shafts 122 and 124.

As shown in FIGS. 3 and 5, the gear 108 drives stop wheel 126 cooperating with stop pin 128 to mechanically limit rotation of the linkage arrangement. The stop wheel 126 also serves as a cam for the tilt limit switch 130 (FIG. 5) mounted on the back of Z slide 64.

A receptacle and socket 132 (FIG. 4 only) may be used to convey electrical signals to and from the various electrical components of carrier 10 by way of wires (not shown).

OPERATION

With reference to FIGS. 1 and 2, the operation of the present invention will be discussed in detail. The robotics arm 12 has been preprogrammed by a microprocessor or other control system to move generally in a Y direction as illustrated in FIG. 2 or into or out of the plane of the drawing of FIG. 1, but may also make coarse movements in the X direction as illustrated in FIG. 1 and rotate about its center line 40. The electrode 18 may thus follow a seam at weld puddle 26 of FIG. 1 between the work pieces 28 and 30. Most importantly, the tip of the electrode 18 is in line with the robot rotation center line 40. Accordingly, if the robotics arm 12 is rotated, the electrode 18 will rotate but remain over the same part of the work surface 14. This absence of offset between the electrode 18 and the robot rotation center line 40 minimizes the need for the computer program operating the robotics arm 12 to take into account adjustments to the position of the torch 16 caused by operation of the robotics tool carrier assembly 10 except when electrode 18 is purposely offset by use of X member 42.

Precision spacing between the electrode 18 and the work piece or work pieces 28 and 30 is necessary to properly start, maintain, and stop the electric arc between the electrode 18 and the work pieces. The robotics tool carrier assembly 10 of the present invention uses the Z slide 64 and Z motor 72 to adjust the distance between the torch electrode 18 and the work surface 14 (the Z direction in FIG. 1). More specifically, the control circuitry or microprocessor turns on the small D.C. servo Z motor 72 until the motor 72 has driven the Z slide 64 into a proper position. The proper position is determined by sensing the output of the Z angular position sensor 90. This output may be fed into a comparator (not shown), the control circuit or microprocessor keeping the Z motor 72 turned on until an error signal becomes zero or effectively zero (depending upon the number of bits and specifics of the microprocessor).

Upon completion of the servodriven vertical movement of the Z slide 64 using the Z resolver 90, further vertical movements of the torch 16 may be provided by the Z motor 72 in order to maintain the arc voltage at a predetermined level. In particular, the arc voltage may be sensed from the welding power supply (not shown) and compared with a desired arc voltage in order to generate an error signal to control the Z servo-motor 72. Following completion of the welding, the Z resolver 90 may again be used for servo-operation of the Z motor 72 in order to retract the torch 16.

It should be noted that an advantageous characteristic of the Z worm gear 74 and Z worm wheel 76 is their tendency to resist rotation when power is removed from the Z motor 72. A further advantageous feature of the vertical movement adjustability of tool carrier assembly 10 is that the slide bars 66 are parallel to the center line of robot rotation 40 provided that the X member 42 is disposed in a neutral or zero offset position. Thus, Z movement may be accomplished without cross-coupled changes in X or Y position of the torch.

The tilt structure including the primary links 102 and 110 and the secondary links 112 and 114 allows the torch 16 to be tilted up to ±45° in either direction about an axis Y1 (FIG. 2) which extends through the tip of the electrode 18. This permits welding an inside corner or moving the torch to avoid a vertical obstruction such as 32 adjacent to the weld path. In particular, the microprocessor controlling the robotics tool carrier assembly 10 would be programmed such that tilt motor 94 would operate the links 102, 110, 112, and 114 to cause them to assume the phantom line position of FIG. 1 when the torch 16 passes adjacent to the vertical portion 32. As illustrated in FIG. 1, the vertical postion 32 would normally block the torch 16, but would allow it to pass upon the tilting of the torch 16 by way of the linkage arrangement. The primary links 102 and 110 are driven by the tilt worm gear 98 (see especially FIGS. 3 and 4), tilt worm wheel 100, and motor 94. Gear 104 in turn drives spur gear 106 and gear 108 having primary link 110 mounted thereon. The tilt resolver or angular position sensor 96 outputs a signal dependent upon the position of the tilt motor 94 and, thus, the linkage structure. This signal may be compared to a signal representing a desired linkage position to generate an error signal for servo-operation of the small D.C. tilt servomotor 94.

Most importantly, the links 102, 110, 112, and 114 will tilt the torch 16 about the axis Y1 (shown in FIG. 2 and perpendicular to the view of FIG. 1) such that the tip of electrode 18 will be disposed over the same point of the work surface 14 as before the tilting. Further, and as illustrated in the phantom line view of FIG. 1, this tilt or rotation about axis Y1 allows the tip of electrode 18 to stay in line with the center line of robot rotation 40, thereby avoiding any complicating offsets between the center line 40 and the electrode.

The initiation of the tilt function may be preprogrammed to occur adjacent the obstruction 32 and, of course, use the tilt resolver 96 to feed a comparator to generate an error signal for tilt servomotor 94.

The horizontal movement or movement in the X direction (FIG. 1) of the torch 16 is accomplished by the X carriage or member 42 which is pivotably mounted to the arm mount back plate 38 for rotation about Y2 pivot axis 44. The torch 16, linkage of links 102, 110, 112, and 114, and Z slide 64 are compactly mounted on the X carriage 42. A large radius arm from the electrode 18 to the pivot axis 44 permits sufficient X motion with only a small cross coupling in the Z direction which may be readily compensated for by the Z motor 72. In particular, the X motor 54, which is a small D.C. servomotor, drives the worm wheel 50 by way of the worm gear 56 (see especially FIG. 5). The worm wheel 50 in turn pivots the X carriage 42 about the axis Y2 or 44 (FIG. 2) which is parallel to the axis Y1 and perpendicular to the axes X and Z. The X angular position sensor or resolver 58 senses the X carriage position and is used to initially position the torch electrode 18 such that its tip is adjacent to the programmed weld joint position at the start of the weld process. When the welding has begun, the X motor 54 is preferably servoed from an optical seam follower which may be obtained from an external sensor such as circuitry which interprets the optical signals received from housing 24 of the torch 16.

The robotics tool carrier assembly 10 has at least one degree of freedom (X axis) which is duplicative of a degree of freedom of robotics arm 12.

Although the present robotics tool carrier assembly 10 has been described with specific reference to an electric arc welding device 16, it will be readily appreciated that it may be useful with other tools such as lasers, adhesive guns, or gasket guns. Alternately, the non-rigid contact tool could simply be a sensing device such as the optical sensing system within housing 24 (FIG. 1). Quite significantly, the tilt feature of the present carrier assembly 10 allows the tool to be tilted around any vertical obstructions and facilitates the use of the tool in an inside joint. This feature is realized by tilting the tool about the axis Y1 (FIG. 2) which runs through the electrode 18. On the other hand, if the robotics tool carrier assembly 10 was used for mounting a laser, the linkage structure could be arranged such that the tool would tilt about a point directly on the work surface 14. Otherwise, rotation of the laser would cause an X direction offset in the point of operation on the working surface 14. Generally then, the tilt axis such as Y2 in FIG. 2 should be no closer to the arm support including parts 34, 36, and 38 than the tip of the tool (such as the tip of electrode 18 of torch 16 in FIG. 2).

Both the X carriage 42 and Z slide 64 may be considered as members because they are intermediate to the arm mount back plate 38 and the tilt links 102, 110, 112 and 114. Likewise, both X motor 54 and Z motor 72 may be considered as intermediate motors.

Although the arm mount top plate 34 is shown directly attached to the robotics arm 12 in FIGS. 1 and 2, it will be readily appreciated that the top plate 34 could be bolted to a mounting plate 134 (FIG. 4 only, bolts not shown). The mounting plate 134 could simply serve as an interface between the top plate 34 and a robotics arm (not shown in FIG. 4). Regardless of whether the top plate 34 is directly or indirectly attached to the robotics arm 12 (FIGS. 1 and 2), the robotics tool carrier assembly 10 should be mounted relative to the robotics arm 12 such that the tip of the tool (e.g., the tip of electrode 18) will be in line with the center line of robotic rotation 40.

While the invention has been particularly shown and described with reference to the illustrated preferred embodiments, it will be understood by those skilled in the art that various modifications and adaptations in form and details may be made in the invention without departing from the spirit and scope of the invention.

What is claimed is:
1. A robotics tool carrier assembly comprising:
 (a) an arm mount adapted to mount the assembly on a robotics arm;
 (b) an X member pivotally supported by said arm mount;
 (c) a Z slide supported by said X member;

(d) a tilt structure supported by said arm mount by way of said X member and said Z slide;
(e) said tilt structure comprising a tilt linkage including two primary links pivotably attached to said Z slide and two secondary links, and at least one of said secondary links is pivotably attached to both of said primary links;
(f) a tilt motor operable to tilt said tilt structure relative to said arm mount such that the primary links may be pivoted about a Y1 axis perpendicular to a Z axis, said tilt motor and said tilt structure together allowing change in the angle of the primary links relative to a work surface;
(g) an X motor operable to move said X member relative to said arm mount such that the position of the primary links is adjusted in an X axis perpendicular to said Y1 axis and said Z axis;
(h) a Z motor operable to move said Z slide by a drive pulley relative to said arm mount such that the tilt linkage is adjusted in said Z axis; and
(i) a Z position sensor for sensing the position of said Z slide relative to said X member, said Z position sensor being driven by said drive pulley.

2. A robotics tool carrier assembly comprising:
(a) a mount;
(b) an X member pivotably supported by said mount;
(c) a tilt structure supported by said mount by way of said X member;
(d) said tilt structure comprising a tilt linkage including two primary links driven from a tilt motor and two secondary links, said two secondary links each pivotably attached to at least one of said primary links;
(e) said tilt motor operable to tilt sand tilt structure relative to said mount such that the primary links may be pivoted in a Y1 axis perpendicular to a Z axis; and
(f) an X motor operable to pivot said X member about a Y2 axis relative to said mount such that the primary links are adjusted in an X axis perpendicular to said Y1 axis, said Y2 axis being parallel to said Y1 axis.

3. The robotics tool carrier assembly of claim 1 further comprising a tool mounted on said tilt linkage and having a tip for movement normal to a work surface while said tool is directed upon the work surface.

4. A robotics tool carrier assembly comprising:
(a) a mount;
(b) an X member pivotably supported by said mount;
(c) a Z slide slidably mounted to said X member;
(d) a tilt structure supported by said mount by way of said X member;
(e) said tilt structure comprising a tilt linkage including two primary links and two secondary links; said two secondary links each pivotably attached to at least one of said primary links;
(f) a tilt motor operable to tilt said tilt structure relative to said mount such that the tilt structure may be pivoted about a Y1 axis perpendicular to a Z axis; said tilt motor and said tilt structure together allowing change in the angle of the tilt structure relative to a work surface;
(g) an X motor operable to pivot said X member about a Y2 axis relative to said mount such that the X member position is adjusted in an X axis perpendicular to said Y1 axis, said Y2 axis being parallel to said Y1 axis; and
(h) a Z motor operable to slide said Z slide relative to said mount such that the Z slide position is adjusted in said Z axis, and wherein said primary links are pivotably attached to said Z slide.2/

5. The robotics tool carrier assembly of claim 4 further comprising:
a tilt position sensor for sensing the position of said tilt linkage;
a Z position sensor for sensing the position of said Z slide relative to said X member; and
an X position sensor for sensing the position of said X member relative to said arm mount.

* * * * *